US012181147B2

(12) United States Patent
Van Asselt et al.

(10) Patent No.: US 12,181,147 B2
(45) Date of Patent: Dec. 31, 2024

(54) LASER-BASED LIGHTING DEVICE

(71) Applicant: SIGNIFY HOLDING B.V., Eindhoven (NL)

(72) Inventors: Robert Van Asselt, Valkenswaard (NL); Dominique Maria Bruls, Heeze (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/038,817

(22) PCT Filed: Nov. 25, 2021

(86) PCT No.: PCT/EP2021/082935
§ 371 (c)(1),
(2) Date: May 25, 2023

(87) PCT Pub. No.: WO2022/117422
PCT Pub. Date: Jun. 9, 2022

(65) Prior Publication Data

US 2024/0210011 A1 Jun. 27, 2024

(30) Foreign Application Priority Data

Dec. 1, 2020 (EP) .................................... 20210877

(51) Int. Cl.
*F21V 9/40* (2018.01)
*F21V 5/04* (2006.01)
(Continued)

(52) U.S. Cl.
CPC .................. *F21V 9/40* (2018.02); *F21V 5/04* (2013.01); *F21V 9/30* (2018.02); *F21V 13/02* (2013.01); *H05B 45/18* (2020.01); *F21Y 2115/30* (2016.08)

(58) Field of Classification Search
CPC ... F21S 45/70; G02B 5/22; F21V 9/40; F21V 25/02; F21V 9/30; F21V 9/32; H05B 45/18; F21Y 2115/30
See application file for complete search history.

(56) References Cited

U.S. PATENT DOCUMENTS 9,261,259 B2 * 2/2016 Shiomi ................. F21S 41/285
9,551,474 B2 * 1/2017 Nagao ..................... F21V 13/14
(Continued)

FOREIGN PATENT DOCUMENTS

CN 204962534 U 1/2016
EP 0303072 A2 2/1989
(Continued)

*Primary Examiner* — Omar Rojas Cadima

(57) ABSTRACT

This invention relates to a safety measure taken against unsafe exposure of high-intensity laser light that is relevant for the reliable and safer operation of laser-based lighting devices. According to this invention, a lighting device comprises a first light-emitting semiconductor device and a light-conversion device. The first light-emitting semiconductor device is a laser device configured to generate a first light output and the 5light-conversion device is configured to receive the first light output and convert at least part of the first light output into a converted light output. The lighting device further comprises an optical element configured to receive the converted light output from the light-conversion device. The optical element is configured to transmit the converted light output and the first light output, and attenuate the first light output above a threshold value of the first light output.

16 Claims, 11 Drawing Sheets

(b)

(51) Int. Cl.

| | |
|---|---|
| ***F21V 9/30*** | (2018.01) |
| ***F21V 13/02*** | (2006.01) |
| ***H05B 45/18*** | (2020.01) |
| *F21Y 115/30* | (2016.01) |

(56) References Cited

U.S. PATENT DOCUMENTS

| | | | | |
|---|---|---|---|---|
| 9,891,439 | B2 * | 2/2018 | Hu | G02B 27/14 |
| 10,414,326 | B2 * | 9/2019 | Gut | F21S 41/147 |
| 2005/0270775 | A1 * | 12/2005 | Harbers | H04N 9/3161<br>257/E33.071 |
| 2012/0057364 | A1 * | 3/2012 | Kishimoto | F21K 9/64<br>29/428 |
| 2016/0033112 | A1 * | 2/2016 | Weissenberger | F21S 41/16<br>362/510 |
| 2017/0261191 | A1 * | 9/2017 | Kawachi | F21V 11/186 |
| 2018/0094788 | A1 * | 4/2018 | Tokida | F21S 43/195 |
| 2019/0257483 | A1 * | 8/2019 | Hechtfischer | F21S 41/176 |
| 2019/0264894 | A1 | 8/2019 | Aketa | |
| 2020/0011506 | A1 | 1/2020 | Mao et al. | |
| 2020/0049337 | A1 * | 2/2020 | Tsai | H01S 5/02216 |
| 2020/0056751 | A1 | 2/2020 | Sugiyama et al. | |

FOREIGN PATENT DOCUMENTS

| | | | |
|---|---|---|---|
| EP | 2297827 | A2 | 3/2011 |
| FR | 41070 | E | 10/1932 |
| WO | 2010004477 | A2 | 1/2010 |
| WO | 2017059472 | A1 | 4/2017 |

* cited by examiner (a)

(b)

(a)

(b)

(a)

(b)

(a)

(b)

(a)

(b)

LASER-BASED LIGHTING DEVICE

Cross-Reference to Prior Applications

This application is the U.S. National Phase application under 35 U.S.C. § 371 of International Application No. PCT/EP2021/082935, filed on Nov. 25, 2021, which claims the benefit of European Patent Application No. 20210877.5, filed on Dec. 1, 2020. These applications are hereby incorporated by reference herein.

FIELD OF INVENTION

This invention relates to a laser-based lighting device, in particular to a passive measure taken against unsafe exposure to high-intensity laser light for safer operation of the laser-based lighting device.

BACKGROUND OF THE INVENTION

High brightness lighting devices have enormous demand in applications such as projection, stage-lighting, spot-lighting, and automotive lighting. For this purpose, laser-phosphor technology can be used, wherein a laser provides high brightness light and a remote phosphor acts as a wavelength converter to produce converted light from the laser light. The easiest way to produce white light is by using a blue pump laser light in combination with phosphor-converted yellow light. The pump blue laser light is scattered by the phosphor converter. As a result, the etendue of the blue pump laser light is increased, rendering it far less dangerous than a beam originating directly from a laser source. However, an unsafe situation may occur where high-intensity laser light can come out of the device. Such a critical system failure may relate to the damage or disappearance of the remote phosphor, caused by e.g. thermal-mechanical stresses, external shock, etc. In such a case, the shape and geometrical properties of the blue pump laser beam are not altered anymore. This may lead to dangerous situations, as the laser beam can be highly parallel, or can be re-focused into a very small spot. When this happens, the reflection or transmission of the blue pump laser light from the phosphor unit may increase up to an unsafe level. This condition may lead to damage in the light engine as well as the emission of highly directed laser light into the ambient.

In general, eye safety is of major concern in laser-based (pumped) lighting devices. In case of a failure, it is important to prevent focused or collimated laser light from escaping the lighting device, which may create the possibility of exposing naked eyes to the direct laser light. Depending on the exact construction of the lighting device, the lighting device may fall under the laser safety directive IEC60825 or the general lighting norm like IEC62471. By safeguarding negative effects in case of a failure, the classification and hazard level may be reduced to lower hazard or risk classification levels. Ensuring safety as well as lowering the classification and hazard level of such products is paramount for enabling easier market acceptance and obtaining a lower laser class. In general, single fault conditions need to be taken into account in the classification process.

EP 2297827 B1 discloses a technique for enabling the safety of a laser-based lighting device. According to this prior art, the laser-based lighting device comprises a laser-output sensor for determining a laser-output signal being correlated with the output of laser light, a converted-light sensor for determining a converted-light signal being correlated with the output of converted light emitted by the light-conversion device (e.g. phosphor converter), and a controller configured to receive the laser-output signal and the converted-light signal to determine a safe-to-operate parameter and to control the operation of the laser-based light source such that no unsafe exposure takes place.

WO 2017059472 A1 discloses a lighting device having at least one laser light module and at least one light-emitting region in the form of at least one conversion element. The lighting device further comprises a diagnostic device, which is designed for checking the functioning of the laser light module, and wherein at least one conversion element emits light, in particular white light, e.g. mixed light, in particular white mixed light. At least one optically active optic element is provided, which optic element can assume a locked state, in which locked state the optic element weakens laser light beams in terms of the irradiation strength thereof, and wherein the at least one optic element is arranged such that laser light beams output from the laser light module must pass through the optic element, and wherein the at least one optic element can be controlled in accordance with information from the diagnostic device in such a way that in the event of an inability to function of the laser light module determined by the diagnostic device, the at least one optic element is switched into the locked state or remains in the locked state.

SUMMARY OF THE INVENTION

The arrangements suggested in the prior arts require several additional components in the form of electrical circuitry and sensors which may result in an expensive and complex laser-based lighting device. Additionally, laser-based lighting applications often focus on miniaturization which is hindered by these electrical components requiring additional package space. Furthermore, the safety of such a lighting device is dependent on the proper functioning of these components. Electrical components are often limited by reliability and may not work well in harsh environments. Also, the electrical components may experience issues due to electromagnetic interference and false tripping.

Here, the inventors suggest building a safety mechanism that prevents unsafe high-intensity laser light from leaving the lighting device without the need for additional circuitry and sensors, but which relies on physical properties of used materials and/or components, resulting in an inherently safe system.

It is therefore an object of the invention to improve the safety of laser-based lighting devices for enhanced reliability and that requires fewer components enabling miniaturization and potentially lower cost.

The object of the invention is achieved by providing a lighting device having the features as defined in the independent claim. Preferred embodiments are defined in the dependent claims.

According to a first aspect, the lighting device comprises a first light-emitting semiconductor device and a light-conversion device. The first light-emitting semiconductor device is a laser device configured to generate a first light output and the light-conversion device is configured to receive the first light output and convert at least part of the first light output into a converted light output in an illumination direction. The lighting device further comprises an optical element configured to receive the converted light output from the light-conversion device. The optical element comprises a bistable optical material that can change from an optical transmissive state to an optical attenuative state depending on a threshold value of the first light output. The optical element is configured to transmit the converted light output and the first light output, and attenuate the first light output above a threshold value of the first light output.

The first light-emitting semiconductor device is a laser device and suitable examples of the laser device may include any one of a gas, dye, solid-state, or semiconductor laser (e.g. diode laser or a vertical-cavity surface-emitting laser—VCSEL).

The first light-emitting semiconductor device is configured to emit a first light output towards a light conversion device. The light conversion device may be a volume of phosphor material film or block in the crystalline or polycrystalline state.

The first light output comprising a first spectral distribution impinging on the light conversion device may be at least partially converted into a converted light output comprising a second spectral distribution. For example, a phosphor material exposed to blue pump laser light may result in the second wavelength light which is a broadband yellow light. And the remaining part of the unconverted first light output may transmit through the light conversion device. The combination of the converted light output and the unconverted first light output may result in a light comprising a third spectral distribution. For example, mixing blue light and yellow light results in white light. The converted light output and the unconverted first light output may be eye-safe in terms of intensity or power-density, which may be related to the limitation of the light conversion efficiency, lower energetic photon composition of the converted light output and spatial distribution of the final combined light-beam. The optical element may be configured to receive and transmit the converted light output from the light-conversion device and the unconverted first light output.

An unsafe situation may occur where an unsafe level of the first light output can come out of the lighting device. If the light conversion device is damaged, at least a substantial part of the first light output may pass through the damaged light conversion device and may be received by the optical element. In such a condition, the optical element is configured to attenuate the first light output as the first light output increases above a threshold value. The attenuation may completely block the first light output or at least reduce the first light output to an eye-safe level (e.g. 0.01 watts per square centimeter, more preferably 0.001 watts per square centimeter).

The optical element may comprise a bistable optical material that can change from an optical transmissive state to an optical attenuative state depending on a threshold value of the first light output. Also, the optical element may exhibit a gradual change from an optical transmissive state to an optical attenuative state depending on a threshold value of the first light output. The change in the attenuating properties of the optical element may be reversible or irreversible. The optical element may be conceived as a surface layer on components relevant for the lighting device, such as a dichroic reflector, lens, or exit window on a housing of the lighting device.

In the context of the invention, the term ‘attenuate’ refers to optical attenuation by means of absorption, scattering, diffusing and/or reflection. Additionally, optical attenuation may be also realized by the optical element that is configured to increase the etendue of the first light output above a threshold value of the first light output. The light beam may exhibit increased etendue as a result of interaction with scattering, blurring, mixing, or diffusing features of the optical element in the optical attenuative state. When unsafe level of the first light output is exposed to the optical element, the etendue may increase by a factor of 10, more preferably 100 and most preferably 1000.

The light-conversion device may transmit the first light output impinging on a light entry surface of the light conversion device. The transmitted light may be a combination of the converted light output and the unconverted first light output. The transmitted light may also be scattered by the roughness of the light entry surface and thereby increase the etendue of the transmitted light.

The light-conversion device may further comprise a light reflector and the light reflector may be located on the opposite side of a light entry surface of the light-conversion device.

Depending on the angle, the first light output may reflect back from the light reflector several times into the light-conversion device. Therefore, this configuration allows for efficient light conversion.

The lighting device may further comprise a first optics arrangement. The first optics arrangement may be located between the first light-emitting semiconductor device and the light-conversion device with the light reflector located on the opposite side of a light entry surface of the light-conversion device. The first optics arrangement may be configured to transmit the first light output towards the light-conversion device and reflect the converted light output and the first light output reflected from the light reflector of the light conversion device towards the illumination direction, wherein the optical element may be configured to receive the reflected light from the first optics arrangement.

The first optics arrangement may comprise a dichroic splitter and a quarter-wave plate. The dichroic splitter is configured to transmit the first light output and reflect the converted light output and the unconverted first light output. When the quarter-wave plate is at 90 degrees with respect to the polarization of the first light output, the first light output and the unconverted first light output may have opposite polarization from each other. If the dichroic splitter band-edge is properly chosen, it will be possible to transmit the first light output and reflect the converted light output and the unconverted first light output. Alternatively, one may choose a first optics arrangement in combination with a polarizing beam splitter that is located after a quarter-waveplate. In this case, the polarization beam splitter may transmit one polarization (e.g. the first light output) while reflecting the other one (e.g. the unconverted first light output and the converted light output). One may choose other combinations of optical components for realizing the functionality of the first optics arrangement as described above.

If the light conversion device is damaged, the unsafe first light output may be reflected from the light reflector that is located at the back of the damaged light conversion device, subsequently reflected from the first optics arrangement and eventually received by the optical element. In such a condition, the optical element is configured to attenuate the first light output to an eye-safe level if the first light output increases above a threshold value.

The lighting device may further comprise a first optics arrangement. The first optics arrangement may be located between the first light-emitting semiconductor device and the light-conversion device with the light reflector located on the opposite side of a light entry surface of the light-conversion device. The first optics arrangement may be configured to transmit the first light output towards the light-conversion device and reflect the converted light output and the first light output reflected from the light reflector of the light conversion device towards an illumination direction wherein the optical element is located in between the light-conversion device and the light reflector.

The lighting device may further comprise a second light-emitting semiconductor device configured to generate a second light output and a second optics arrangement. The second optics arrangement may be configured to combine the second light output from the second light-emitting semiconductor device and the transmitted light from the optical element towards an illumination direction. In this case, the light-conversion device may be configured to convert substantially all of the first light output into the converted light output.

For some lighting applications, it may be preferred to introduce a secondary light (for example a blue light) with the converted light (broadband yellow light) in an optical split topology for enabling more flexibility in realizing a wider range of color temperatures and color rendering indexes. This may be achieved by suitably choosing the operation parameters of this second light-emitting semiconductor device. The first light-emitting semiconductor device may function as a pump laser producing the first light output. Hence the first light output may be quite unsafe for exposure to the eye. The second light-emitting semiconductor device may be a laser or an LED that is configured to emit a second light output. The second light output may have a spectral distribution that is the same or at least comparably similar to the first spectral distribution of the first light output. But the power density of the second light-emitting semiconductor device can be safe for the eye and also suitable for general ambient exposure.

During normal operation, the converted light output is combined with the second light output by means of the second optics arrangement. When the light-conversion device is damaged, the first light output may directly pass through the light-conversion device. The optical element may be configured to attenuate the first light output at least to a safe level of attenuation if the first light output is above a threshold value. The attenuated first light output and the second light output may be also combined by means of the second optics arrangement.

The second optics arrangement can be a dichroic combiner that is configured to transmit the converted light output and the first light output while reflecting the second light output in the illumination direction. In this case, the wavelengths and/or polarizations for the first light output and the second light output may be different such that the band-edge of the dichroic combiner allows these two lights to be combined. However, care must be taken such that the combined light with the attenuated first light output and the second light output does not exceed the eye-safe level. The second optics arrangement may be also implemented using different optical components, for example, a combination of polarization filter and polarization-sensitive beam splitter.

The lighting device may comprise an optical lens located downstream from the optical element and the optical lens is for one of collimating, focusing, blurring, or diffusing light in the illumination direction.

Collimating, focusing, blurring, or diffusing light may enable various application areas for the lighting device.

Alternatively, the optical element may be also configured for one of collimating, focusing, blurring, or diffusing light in the illumination direction.

In addition to providing the above-mentioned passive safety feature, the optical element may be also configured to act as a refractive optical lens. The optical element may be shaped into appropriate refractive lenses for collimating, focusing, blurring, or diffusing light in the illumination direction. Such a multi-functional optical element may allow the reduction of the lighting device footprint.

Alternatively, the optical lens may be located downstream from the first optics arrangement.

Alternatively, the optical lens may be located downstream from the second optics arrangement.

The optical element may comprise one of a photochromic or thermochromic material that is configured to absorb or scatter the first light output above the threshold value of the first light output.

A photochromic material may absorb or scatter an above-threshold first light output and thereby attenuate the first light output when exposed above a certain threshold value of the first light output. This increased absorption of the photochromic material may be associated with the darkening or increased scattering of the material as a result of chemical reactions triggered by exposure of an above-threshold power density of the first light output.

Similarly, a thermochromic material may also exhibit an increase in the absorption or scattering of an above-threshold first light output. This may be also associated with the darkening or increased scattering of the thermochromic materials that is triggered by exposure of an above-threshold power density of the first light output which subsequently increases the threshold temperature for such a transition.

The optical element may comprise an optical phase change material that is configured to reflect, absorb, and/or scatter the first light output above the threshold value of the first light output.

Optical phase change materials may change their optical properties from transparent to reflective, absorptive, and/or scattering when exposed to a certain threshold power density of the first light output that yields a phase transition temperature. The phase may change from an amorphous to a crystalline state or vice-versa. As for these optical phase change materials, the phase transition temperatures may be high. An option would be to add an absorber layer on top of the phase change layer to enhance the thermal load in case of a failure. Alternatively, the light may be focused and de-focused, and the optical phase change material would be in the focus of the spot. In that case, the optical density at this point can be very high, and in case of a failure, the laser power density would increase to temperatures above the transition temperature.

When the material turns to a scattering condition, it can be used to divert the light and steer it in multiple directions to prevent the unsafe first light output to reach the user eye. Otherwise, when the material turns to a reflective condition, it can be used to divert the unsafe first light output towards a beam dump by a polarization splitter or polarization-sensitive mirror for safely collecting the reflected light and thereby preventing the unsafe first light output to reach the user eye.

Alternatively, two or more materials in a combined body may be used to realize the optical element. The optical element may comprise a matrix material that acts as a host for certain particles. The matrix material may be in one of a liquid, semi-solid, or solid state. The matrix material may not dissolve or react with the particles. The matrix material may have refractive index matching with the particles when these two materials are transparent to the unconverted first light output and the converted light output. Therefore, the matrix material and the particles may be transparent to the first light output below a threshold value, for example, the unconverted first light output and the converted light output. The particles may become attenuative by becoming absorptive or reflective upon exposure of the first light output above a threshold value. This may reduce the transmission of the unsafe first light output through the optical element to an attenuated first light output. The particles may comprise photochromic or thermochromic as discussed above.

The particles may also cause scattering and thereby increasing the etendue of light and preventing high transmittance. In this case, the particles may become reflective or more refractive upon exposure of the first light output above a threshold value. Hence, the particles may comprise optical phase change materials. For example, the crystallization phase change of the optical phase change materials may turn the transparent material into an opaque material. When unsafe level of the first light output is exposed to the optical element, the etendue may increase by a factor of 10, more preferably 100 and most preferably 1000.

The optical element may comprise a first material joined with a second material. The first material and the second material may be transparent to the first light output below a threshold value, for example, the unconverted first light output and the converted light output. The second material may become attenuative upon exposure of the first light output above a threshold value. Therefore, the second material may be a photochromic, thermochromic, or optical phase change material.

Alternatively, the separation between the first material and the second material may be damaged by the first light output above a threshold value. The separation may be a thin film or barrier separating the first material and the second material from getting in contact with each other. And the first material and the second material may be reactive with each other. Therefore, the damage of the separation by the first light output above a threshold value may allow a chemical reaction between the first material and the second material. The resultant material may become attenuative towards the unsafe first light output above a threshold value. In such a condition, the optical element may attenuate the first light output to a safe level.

The material combination for the optical element is not limited to two materials. One may consider multiple bi-layer configuration or more than two materials comprising the optical element.

The threshold value of the first light output may be a laser power density of 0.5 watts per square millimeter.

Such a value may depend on the eye-safe and other safety standards as well as laser beam spot-size, choice of material for the optical element, desired color temperature, and color rendering index of the lighting device. The threshold value for the laser power density maybe 2 watts per square millimeter, more preferably 1 watt per square millimeter. For example, the power density threshold value may be 0.5 watts per square millimeter for 3000 K and CRI 80 and 1 watt per square millimeter for 4000 K and CRI 80.

The first light-emitting semiconductor device may have a spectral power distribution in a range of 405 to 470 nm, preferably in a range of 440 to 460 nm, and it may also be centered around 445 nm. The spectral distribution of the second light-emitting semiconductor device may also be in the range between 405 to 470 nm.

The lighting device may comprise a thermal sensor and a controller. The thermal sensor may be attached to the optical element for detecting the temperature of the optical element and being communicatively connected to the controller. The controller may be configured to turn off the first light-emitting semiconductor device when the detected temperature exceeds a predetermined temperature threshold value.

When the first light output exceeds above a threshold value and the first light output is exposed to the optical element, the temperature of the optical element may increase. Therefore, the controller may be configured to monitor the change in temperature of the optical element and determine the failure or damage of the light-conversion device if the detected temperature exceeds a predetermined temperature threshold value. In case a failure is detected, the controller may be further configured to turn off the first light-emitting semiconductor device through a power switch. This is an additional safety feature to further facilitate an eye-safe laser-based lighting device. The predetermined temperature threshold value may be 10 degrees above the normal operating condition temperature, more preferably, 5 degrees above the normal operating condition temperature.

It should be noted that the invention relates to all possible combinations of features recited in the claims. Other objectives, features, and advantages of the present inventive concept will appear from the following detailed disclosure, from the attached claims as well as from the drawings. A feature described in relation to one of the aspects may also be incorporated in the other aspect, and the advantage of the feature is applicable to all aspects in which it is incorporated.

BRIEF DESCRIPTION OF THE DRAWINGS

The above, as well as additional objects, features, and advantages of the disclosed devices, methods, and systems, will be better understood through the following illustrative and non-limiting detailed description of embodiments of devices, methods, and systems, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF THE EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein: rather, these embodiments are provided for thoroughness and completeness, and fully convey the scope of the invention to the skilled person.

Figure 1:
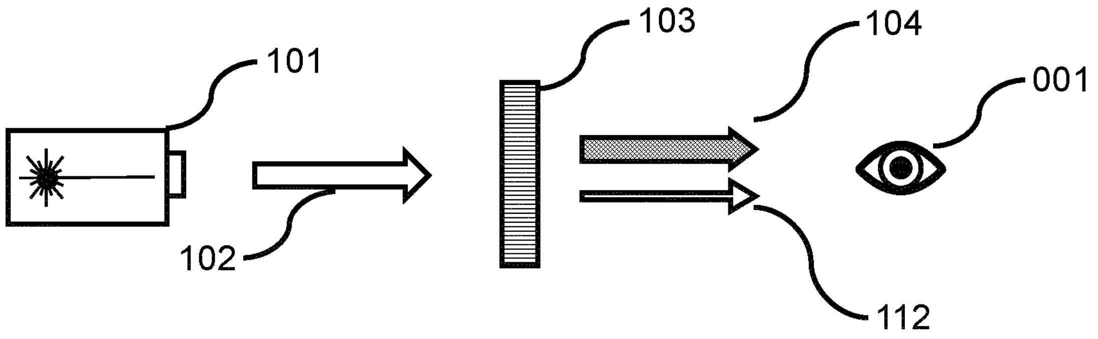
FIGS. 1(*a*) and (*b*) schematically show a typical arrangement for a laser-based lighting device and an unsafe aspect of this arrangement, respectively.
Figure 1:
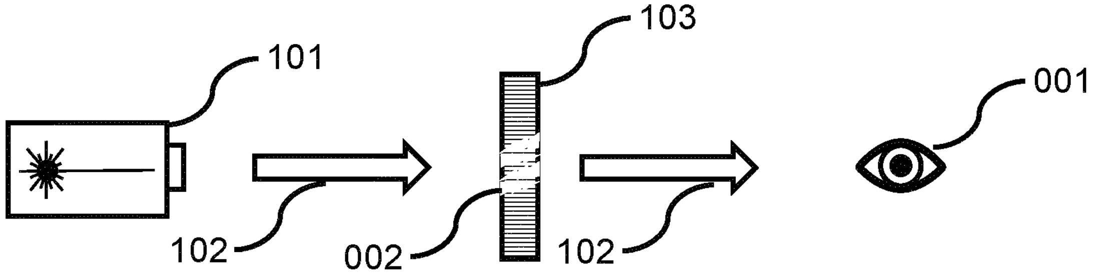

FIG. 1(*a*) schematically shows a typical arrangement for a laser-based lighting device. In this figure, a first light-emitting semiconductor device 101 is depicted to be a laser device 101. The laser device 101 can be any one of a gas, dye, solid-state, or semiconductor laser (e.g. diode laser or a vertical-cavity surface-emitting laser—VCSEL). The laser device is configured to emit a first light output 102 towards a light conversion device 103. The first light output 102 may be blue light having a spectral power distribution in a range of 405 to 470 nm. Preferably in a range of 440 to 460 nm and also may be centered around 445 nm. The light conversion device 103 may be a volume of phosphor material film or block in the crystalline or polycrystalline state. Here, the laser-based lighting device is shown in the transmission remote phosphor mode. The first light output 102 comprising a first spectral distribution is impinging on the light conversion device 103 and is at least partially converted into a converted light output 104 comprising a second spectral distribution, as shown by the converted light output 104 in FIG. 1 (*a*). For example, a phosphor material exposed to blue pump laser light may result in the second wavelength light which is a broadband yellow light. And the remaining part of the unconverted first light output 112 is transmitted through the light conversion device 103. The combination of the converted light output 104 and the unconverted first light output 112 results in e.g. white light emitted in an illumination direction and thereby visible to a user eye 001. The converted light output 104 and the unconverted first light output 112 may be eye-safe in terms of intensity or power-density, which may be related to the limitation of the light conversion efficiency, lower energetic photon composition of the converted light output 104, and spatial distribution of the final combined light-beam.

In FIG. 1(*b*), an unsafe situation may occur where an unsafe level of the first light output 102 can come out of the lighting device. Such a critical system failure may occur due to the damage or disappearance 002 of the remote phosphor in the light conversion device 103, which may be caused by thermal-mechanical stresses. This condition may lead to the emission of the unsafe first light output 102 into the ambient and eventually may reach the user eye 001 that is in line with an illumination direction of the lighting device 100.

Figure 2:
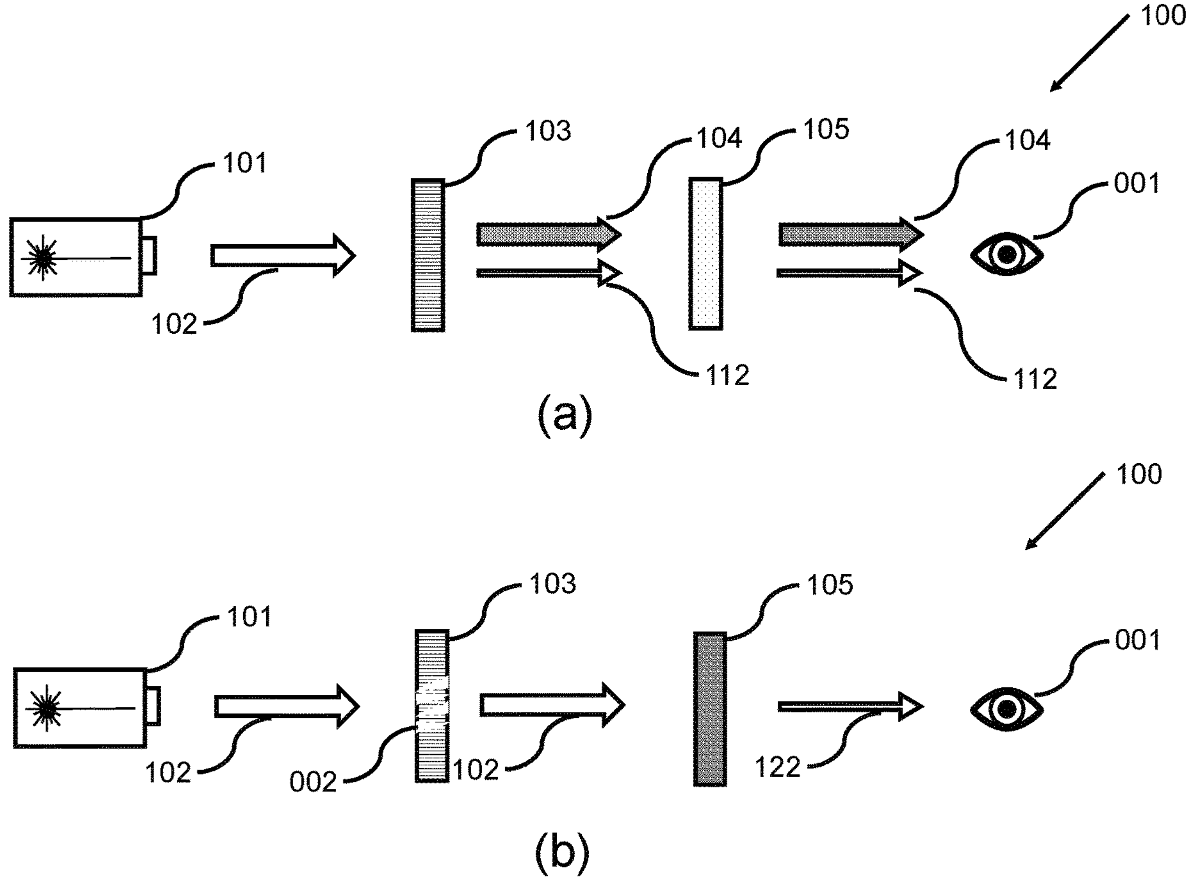
FIGS. 2(*a*) and (*b*) schematically show a lighting device in the normal mode of operation and the safe mode of operation, respectively.

FIG. 2 shows a lighting device 100 for addressing the above mentioned unsafe exposure to unsafe laser light by integrating an optical element 105 into the lighting device 100. In FIG. 2(*a*), a normal mode of operation for the lighting device 100 is shown. The optical element 105 is configured to receive and transmit the converted light output 104 from the light-conversion device 103 and also the unconverted first light output 112. The optical element 105 will remain transmissive in a normal mode of operation as the unconverted first light output 112 impinging on the optical element 105 remains below a threshold value of the first light output 102.

If the light conversion device 103 is damaged 002, at least a large part or all of the unsafe first light output 102 may pass through the damaged light conversion device 103 and is received by the optical element 105, as shown in FIG. 2(*b*). In such a condition, the optical element 105 is configured to attenuate the first light output 102 to a safe level (e.g. 0.01 watts per square centimeter, more preferably 0.001 watts per square centimeter) as the first light output 102 increases above a threshold value. Thereby, reducing the transmission of the unsafe first light output 102 through the optical element 105 to an attenuated first light output 122 and making the lighting device 100 safe for the user eye 001. The attenuation may also result in substantially reduced transmission to complete attenuation of the first light output 102.

The threshold value may be related to the power density of first light output 102 generated by the first light-emitting semiconductor device 101. Such a value may depend on the eye-safe and other safety standards as well as laser beam spot-size, choice of material for the optical element 105, desired color temperature, and color rendering index of the lighting device 100. The threshold value for the laser power density may be 2 watts per square millimeter, more preferably 1 watt per square millimeter. For example, the power density threshold value may be 0.6 watts per square millimeter for 3000 K and CRI 80 and 1 watt per square millimeter for 4000 K and CRI 80.

Therefore, the optical element 105 may comprise a bistable optical material that can change from an optical transmissive state to an optical attenuative state depending on a threshold value of the first light output 102. Also, the optical element 105 may exhibit a gradual change from an optical transmissive state to an optical attenuative state depending on a threshold value of the first light output 102. In this respect, there may be several different materials suitable for realizing the optical element 105.

For example, a photochromic material may absorb or scatter an above threshold first light output 102 and thereby attenuating the first light output 102 when exposed above a certain threshold value of the first light output 102. This increased absorption of the photochromic material may be associated with the darkening or increased scattering of the material as a result of chemical reactions triggered by exposure of an above-threshold power density of the first light output 102.

For practical purposes, one may consider photochromic glasses. The optical properties of the photochromic glass between darkened (absorbing) and cleared (transmissive) state may depend on the glass composition. A cleared transmittance up to 90 percent and a darkened transmittance down to 5 percent may be possible. Photochromic materials suitable for optical applications may be based on silver halide particles that are well known for their use in numerous optical glasses. For example, in the alkali-alumo-boro-silicates, alkali-borates, lead-borates, lanthanum borates, and alumo-phosphates. The alkali-alumo-boro-silicates are most widely used. These glasses are melted together with silver, chlorine, and bromine ions added to the order of several tenths of a percent by mass. The amount of halogen ions may need to exceed the amount of silver ions. Similarly, cuprous ions to the order of 2 to 10 percentile by mass should be present in the glass melt. Essentially fatigue-free photochromism may evolve when such a glass is heat-treated above the glass transition temperature for a suitable time. Silver halide particles containing some cuprous ions are then included in the glass matrix via a complicated phase separation process. Their diameter should be in a range between 10 to 20 nm for maximum photochromism, minimum light scattering, and acceptable dynamics.

Similarly, a thermochromic material may also exhibit an increase in the absorption or scattering of an above-threshold first light output 102. This may be also associated with the darkening or increased scattering of the thermochromic materials that is triggered by exposure of an above-threshold power density of the first light output 102 which subsequently increases the threshold temperature for such a transition.

Depending on the application wavelength and temperature range needed, many different types of thermochromic materials may be available. These thermochromic materials may be inorganic material comprising metals and salts (for example, vanadium oxide) and organic material comprising solvent-based materials. Well-known optical thermochromic materials are often organic leuco-dye mixtures, comprising color former, color developer, and solvent. The color former is usually a cyclic ester that determines the base color. The color developer may be a weak acid that produces the color change and the final color intensity. The solvent (alcohol or ester) melting point may affect the color transition temperature. Thus, the thermochromic transition temperature of a compound may be designed to satisfy the desired application.

Alternatively, optical phase change materials may also suitably represent the optical element 105. Optical phase change materials may change their optical properties from transparent to reflective, absorptive, and/or scattering when exposed to a certain threshold power density of the first light output 102 that yields a phase transition temperature. The phase may change from an amorphous to a crystalline state or vice-versa. As for these optical phase change materials, the phase transition temperatures may be high. An option would be to add an absorber layer on top of the phase change layer to enhance the thermal load in case of a failure. Alternatively, the light may be focused and de-focused, and the optical phase change material would be in the focus of the spot. In that case, the optical density at this point can be very high, and in case of a failure, the laser power density would increase to temperatures above the transition temperature.

When the material turns to a scattering condition, it can be used to divert the light and steer it in multiple directions to prevent the unsafe first light output 102 to reach the user eye 001. Otherwise, when the material turns to a reflective condition, it can be used to divert the unsafe first light output 102 towards a beam dump by a polarization splitter or polarization-sensitive mirror for safely collecting the reflected light and thereby preventing the unsafe first light output 102 to reach the user eye 001.

Many different phase change materials are known from optical storage, rewritable DVDs, and Blu-ray discs. Optical phase change materials may comprise alloys of Germanium (Ge), Gallium (Ga), Arsenic (As), Indium (In), Tellurium (Te), and Antimony (Sb). The optical property of the optical phase change materials, optical property transition condition, and extent of transition may be tailored as per application by choosing as optimum alloy composition.

Figure 3:
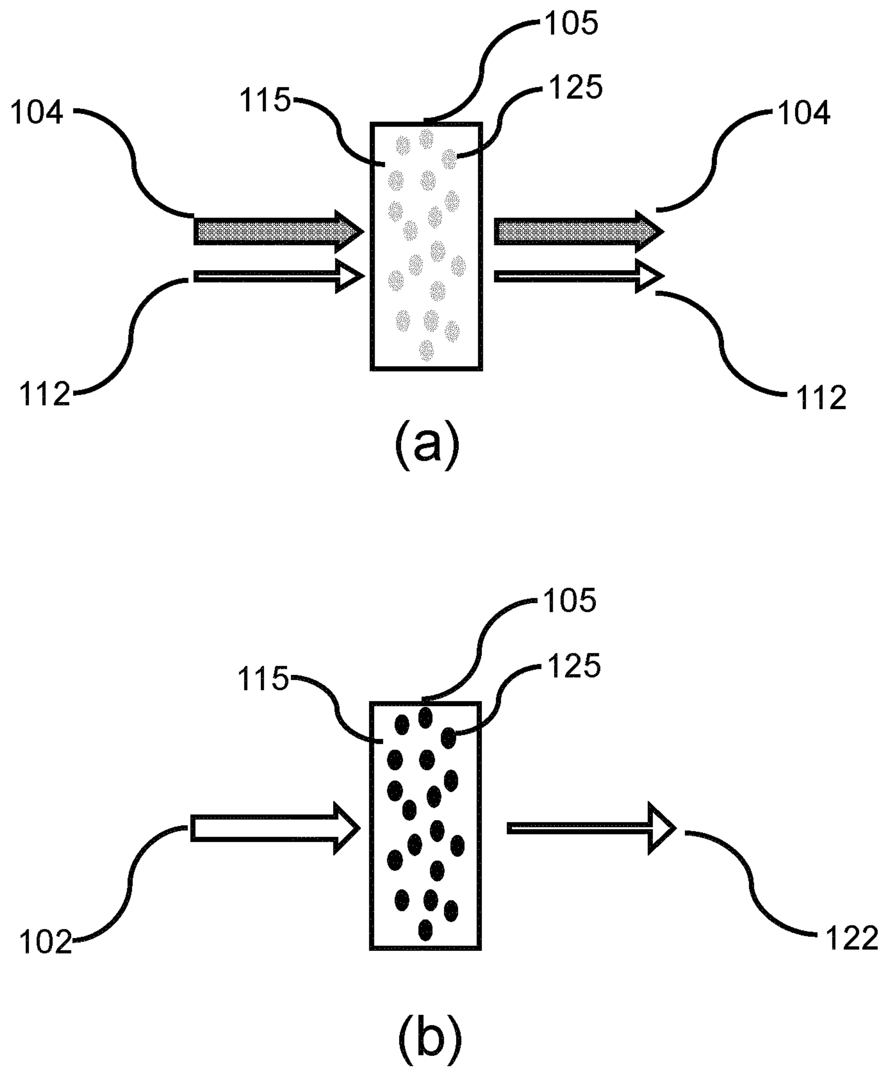
FIGS. 3(*a*) and (*b*) schematically show an optical element in a transparent state and attenuative state that comprises a mixture of two materials, respectively.
Figure 4:
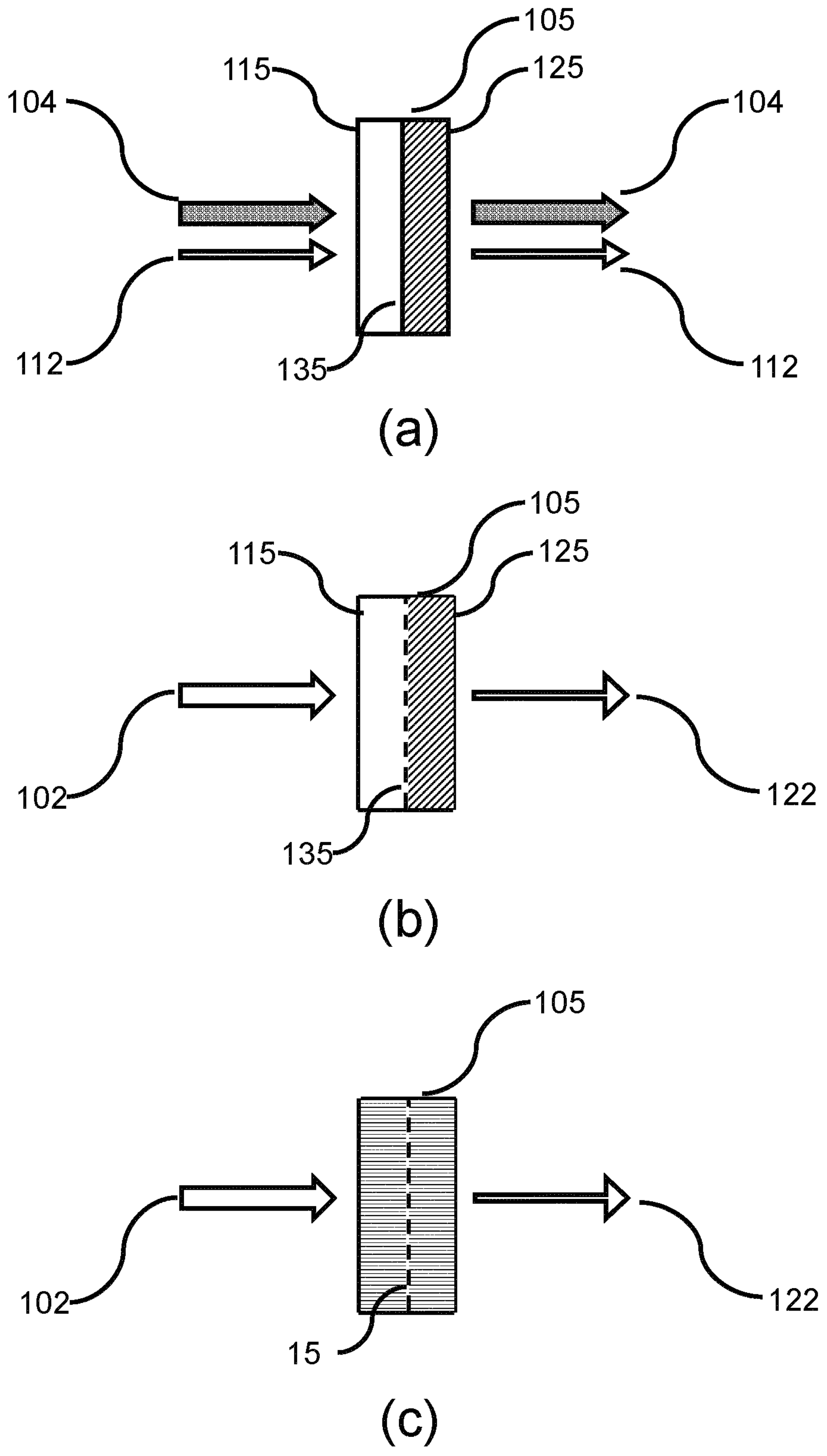
FIGS. 4(*a*), (*b*), and (*c*) schematically show an optical element in a transparent state, transition towards attenuative, and complete attenuative state that comprises two materials, respectively.

Alternatively, two materials may be used to realize the optical element 105 as shown in FIG. 3 and FIG. 4. In FIG. 3, the optical element 105 comprises a matrix material 115 that may act as a host for the particles 125. The matrix material 125 may be in one of a liquid, semi-solid, or solid state. The matrix material 125 may not dissolve or react with the particles 125. The matrix material 115 may have refractive index matching with the particles 125 when these two materials are transparent to the unconverted first light output 112 and the converted light output 104. Therefore, the matrix material 115 and the particles 125 may be transparent to the first light output 102 below a threshold value, for example, the unconverted first light output 112 and the converted light output 104 as shown in FIG. 3(*a*). The particles 125 may become attenuative by becoming absorptive upon exposure of the first light output 102 above a threshold value as shown in FIG. 3(*b*). This may reduce the transmission of the unsafe first light output 102 through the optical element 105 to an attenuated first light output 122. The particles 125 may comprise photochromic or thermochromic materials as discussed above.

The particles 125 may also cause scattering and thereby increasing the etendue of light and preventing high transmittance. In this case, the particles 125 may become reflective or more refractive upon exposure of the first light output 102 above a threshold value. Hence, the particles 125 may comprise optical phase change materials. For example, the crystallization phase change of the optical phase change materials may turn the transparent material into an opaque material.

In FIG. 4, the optical element 105 comprises a first material 115 joined with a second material 125. The first material 115 and the second material 125 may be transparent to the first light output 102 below a threshold value, for example, the unconverted first light output 112 and the converted light output 104 as shown in FIG. 4(*a*). The second material 125 may become attenuative upon exposure of the first light output 102 above a threshold value.

Alternatively, the separation 135 between the first material 115 and the second material 125 may be damaged by the first light output 102 above a threshold value as shown in FIG. 4(*b*). The separation 135 may be a thin film or barrier separating the first material 115 and the second material 125 from getting in contact with each other. And the first material 115 and the second material 125 may be reactive with each other. Therefore, the damage of the separation 135 by the first light output 102 above a threshold value may allow a chemical reaction between the first material 115 and the second material 125. The resultant material 145 may become attenuative towards the unsafe first light output 102 as shown in FIG. 4(*c*). In such a condition, the optical element 105 may attenuate the first light output 102 to a safe level attenuated first light output 122.

The suitable examples of the first material 115 and the second material 125 may include precipitation reactive materials e.g. $Ca_2Cl$ and $Na_2CO_3$ water solutions. When mixed, these will form $CaCO_3$ which is insoluble in water and making an opaque solution. Examples of the formation of organic colored molecules, colored salts, or color formed by acid-base or redox reactions may be also considered. Such as colorless methylene blue turning deep blue upon oxidization also absorbing blue laser light. Colorless ferric ion solution ($Fe^{3+}$) reaction with salt or $H_2O_2$ solution and producing blue colored reaction byproduct. Also, the polymerization reaction between two liquid polymer materials to form a solid polymer may be considered as this may also lead to a change in transparency.

In FIGS. 3 and 4, a combination of two materials is shown for the optical element 105. However, one may also consider multiple bi-layer configuration or more than two materials comprising the optical element 105.

The change in the attenuating properties of the optical element 105 may be reversible or irreversible. The optical element 105 may be conceived as a surface layer on components relevant for the lighting device 100, such as a dichroic reflector, lens, or exit window on a housing of the lighting device.

Figure 5:
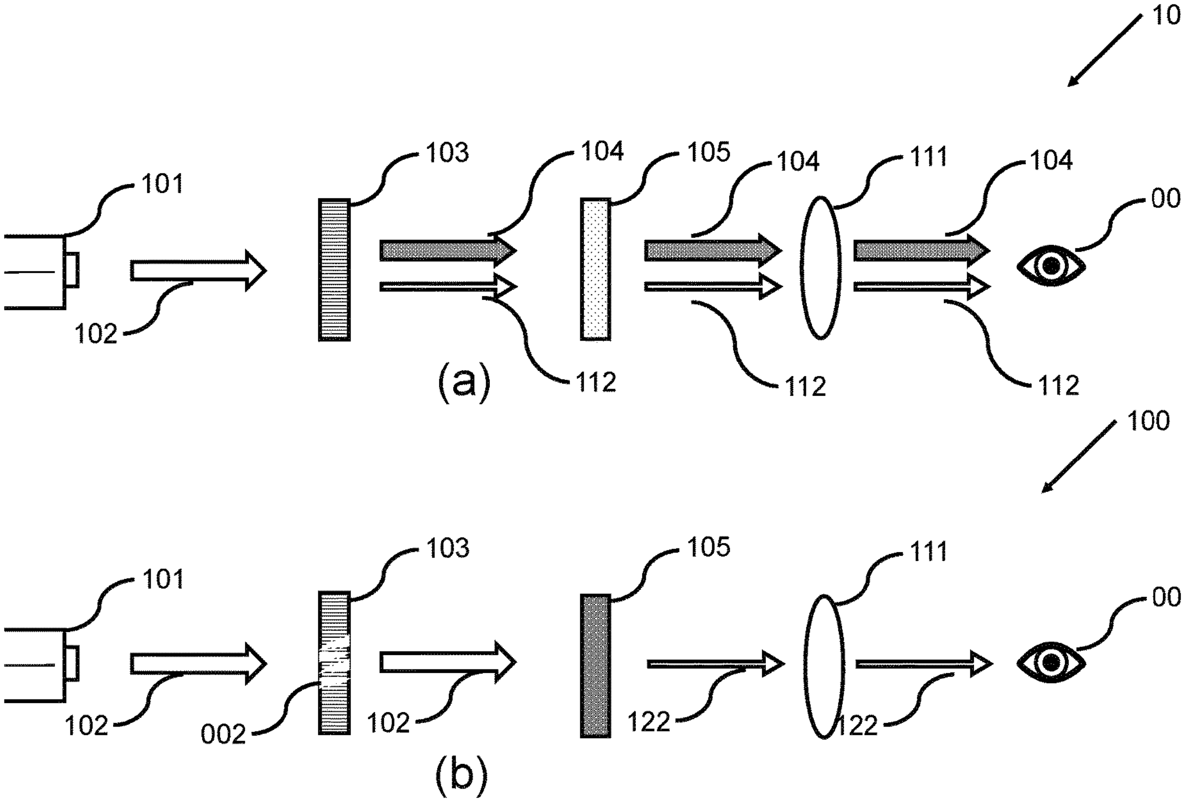
FIGS. 5(*a*) and (*b*) schematically show a lighting device in the normal mode of operation and the safe mode of operation with an additional optical lens, respectively.

FIG. 5(*a*) schematically shows the lighting device 100 in the normal mode of operation with an additional optical lens 111. The optical lens 111 is located downstream from the optical element 105 to collimate, focus, blur, or diffuse the converted light output 104 and the unconverted first light output 112 in the illumination direction of the lighting device 100. FIG. 5(*b*) schematically shows the lighting device 100 in the safe mode of operation with the additional optical lens 111. The optical lens 111 may also collimate, focus, blur, or diffuse the attenuated first light output 122, therefore it may be preferred to have the attenuation of the first light output 102 below the safe level.

Figure 6:
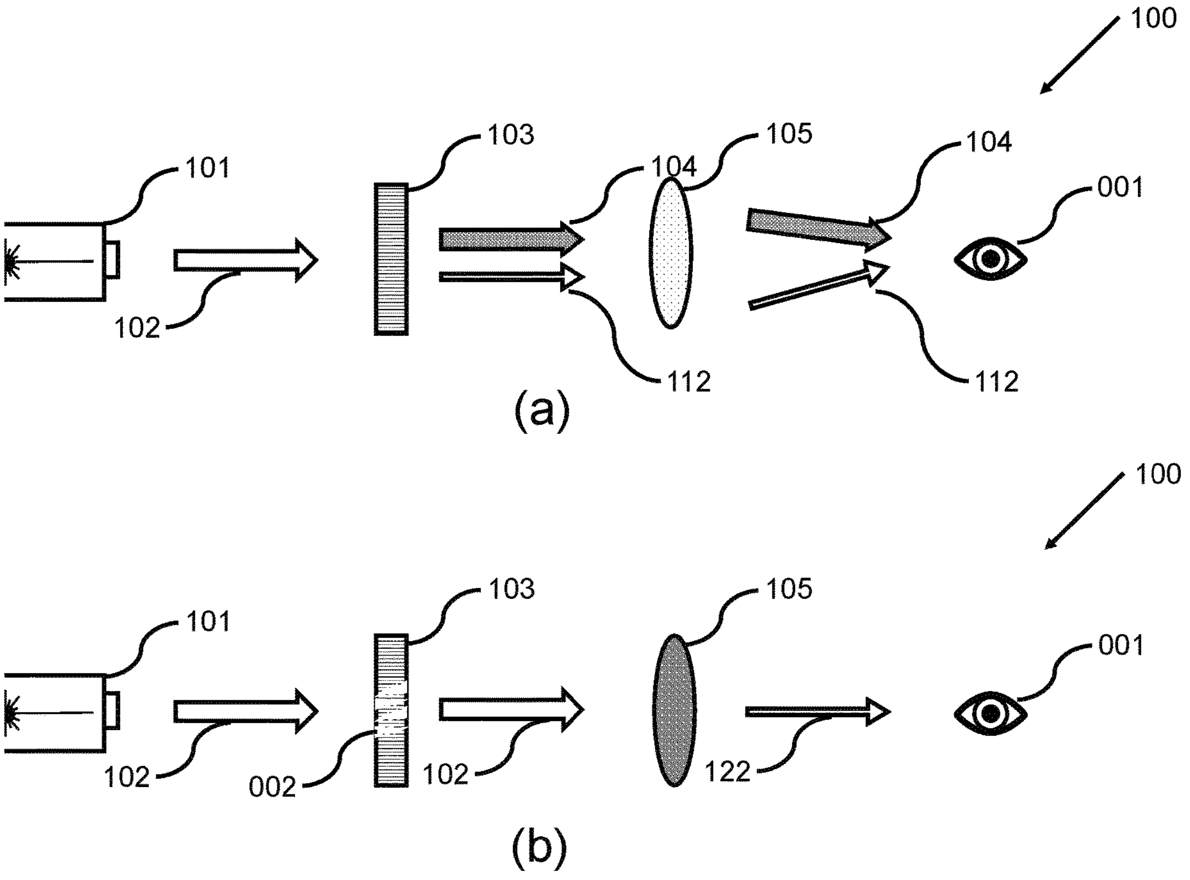
FIGS. 6(*a*) and (*b*) schematically show an optical element shaped as a converging lens in a transparent state and attenuative state, respectively.

In addition to providing the above-mentioned passive safety feature, the optical element 105 may be also configured to act as a refractive optical lens. The optical element 105 may be shaped into appropriate refractive lenses for collimating, focusing, blurring, or diffusing light in the illumination direction. In FIG. 6(*a*), the optical element 105 is schematically shaped as a converging lens for focusing the converted light output 104 and the unconverted first light output 112 in the illumination direction. In FIG. 6(*b*), the optical element 105 acting as the converging lens transitions into an attenuative state for attenuating the unsafe level of first light output 102 to a safe level of attenuated first light output 122.

Figure 7:
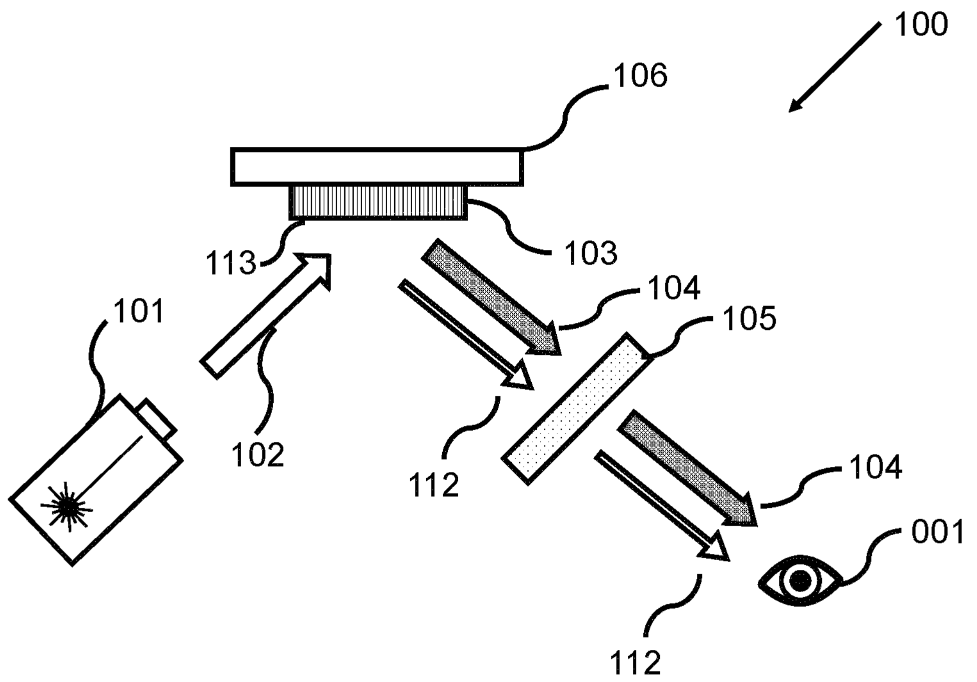
FIGS. 7(*a*) and (*b*) schematically show an alternative arrangement of the lighting device in the normal mode of operation and the safe mode of operation, respectively.
Figure 7:
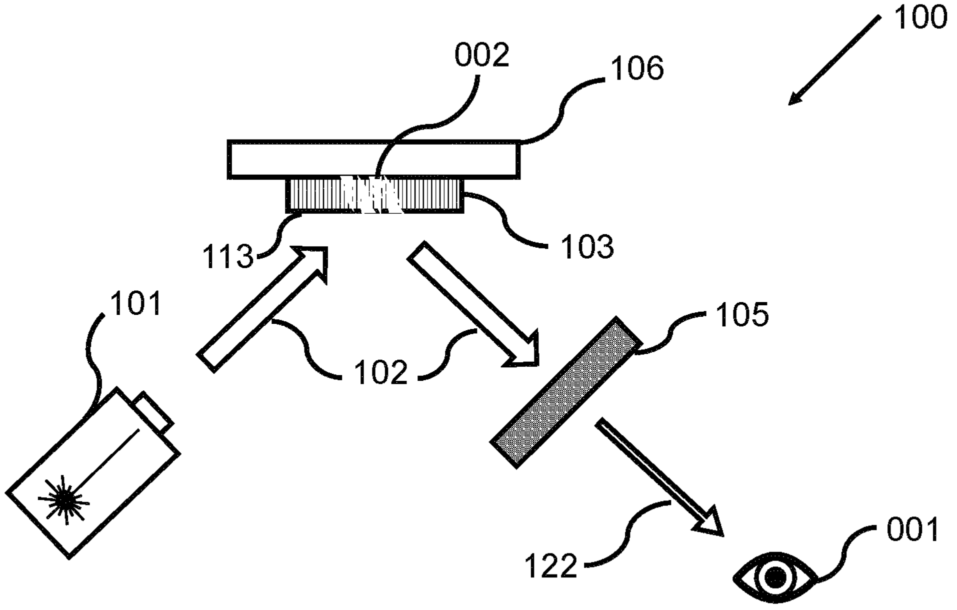

In FIG. 7, the light-conversion device 103 is arranged with a light reflector 106 that is located on the opposite side of a light entry surface 113 of the light-conversion device 103. The first light output 102 from the first light-emitting semiconductor device 101 impinges on the light-conversion device 103 at an angle other than 90 degrees compared to the light entry surface 113. Depending on the angle, the first light output 102 may reflect back from the light reflector 106 several times into the light-conversion device 103. Therefore, this configuration allows for efficient light conversion. However, safety measures with the optical element 105 remain the same as shown in FIG. 2. If the light conversion device 103 is damaged 002, the unsafe first light output 102 may reflect from the damaged light conversion device 103 and received by the optical element 105, as shown in FIG. 7(*b*). In such a condition, the optical element 105 is configured to attenuate the first light output 102 to a safe level as the first light output 102 increases above a threshold value. Thereby, reducing the transmission of the unsafe first light output 102 through the optical element 105 to an attenuated first light output 122 and making the lighting device 100 safe for the user eye 001.

Figure 8:
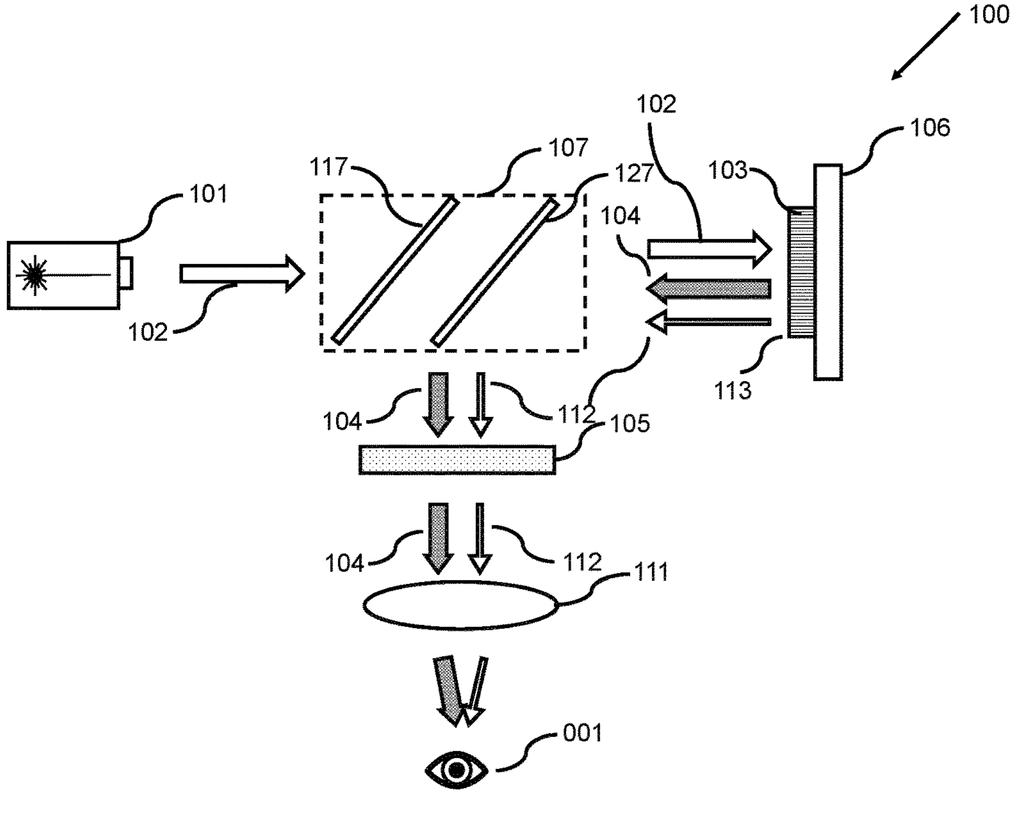
FIGS. 8(*a*) and (*b*) schematically show another alternative arrangement of the lighting device in the normal mode of operation and the safe mode of operation, respectively.
Figure 8:
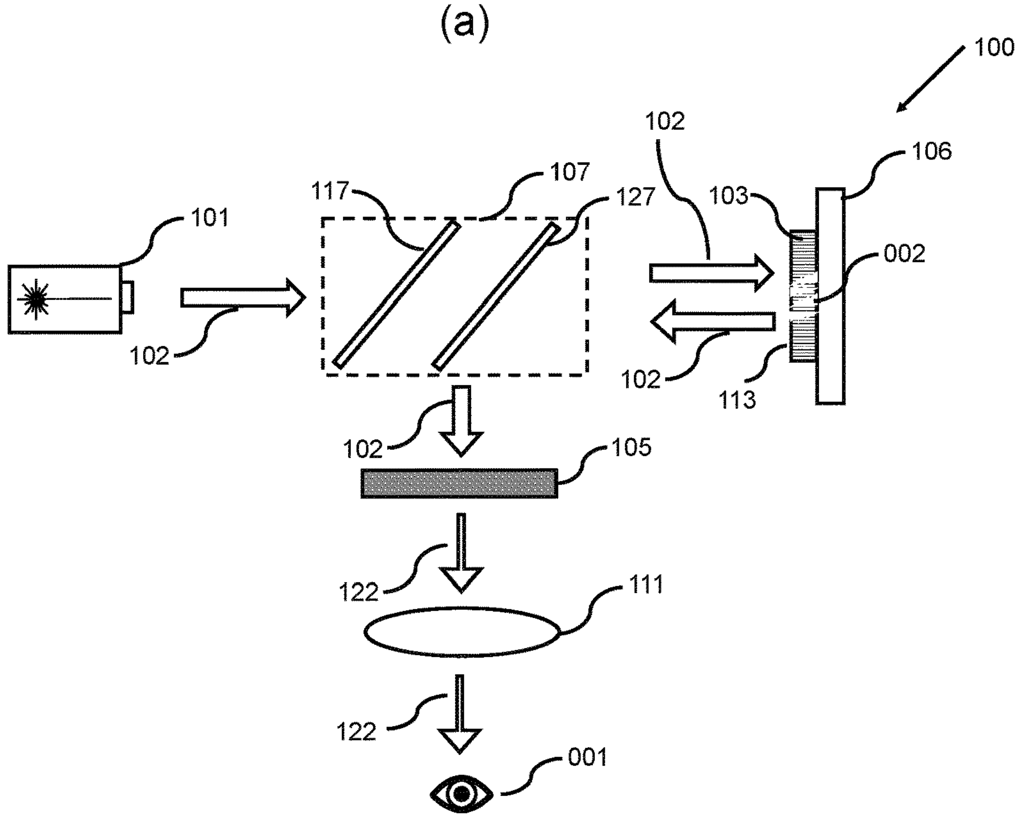

In FIG. 8, the lighting device 100 is arranged to have the light-conversion device 103 with a light reflector 106 as shown in FIG. 7. However, the first light output 102 from the first light-emitting semiconductor device 101 is directed on the light-conversion device 103 at an angle of 90 degrees compared to the light entry surface 113. As shown in FIG. 8, the first optics arrangement 107 is located between the first light-emitting semiconductor device 101 and the light-conversion device 103. As shown in FIG. 8(*a*), the first optics arrangement 107 is configured to transmit the first light output 102 towards the light-conversion device 103, but reflect the converted light output 104 and the unconverted first light output 112. The first optics arrangement 107 may comprise a dichroic splitter 117 and a quarter-wave plate 127 as shown in FIG. 8. The dichroic splitter 117 is configured to transmit the first light output 102 and reflect the converted light output 104 and the unconverted first light output 112. The quarter-wave plate 127 is configured to transmit the first light output 102, the unconverted first light output 112, and the converted light output 104 from any direction. When the quarter-wave plate 127 is at 90 degrees with respect to the polarization of the first light output 102, the first light output 102 and the unconverted first light output 112 may have opposite polarization from each other. If the dichroic splitter 117 band-edge is properly chosen, it will be possible to transmit the first light output 102 and reflect the converted light output 104 and the unconverted first light output 112. Alternatively, one may choose a first optics arrangement 107 in combination with a polarizing beam splitter that is located after a quarter-waveplate. In this case, the polarization beam splitter may transmit one polarization (e.g. the first light output 102) while reflecting the other one (e.g. the unconverted first light output 112 and the converted light output 104). One may choose other combinations of optical components for realizing the functionality of the first optics arrangement 107 as described above.

The optical element 105 is configured to receive the reflected light from the first optics arrangement 107. The light transmitted through the optical element 105 is focused using an optical lens 111. If the light conversion device 103 is damaged 002, the unsafe first light output 102 may be reflected from the light reflector 106 that is located at the back of the damaged light conversion device 103. Subsequently reflected from the first optics arrangement 107 and eventually received by the optical element 105, as shown in FIG. 8(*b*). In such a condition, the optical element 105 is configured to attenuate the first light output 102 to an eye safe level if the first light output 102 increases above a threshold value.

Figure 9:
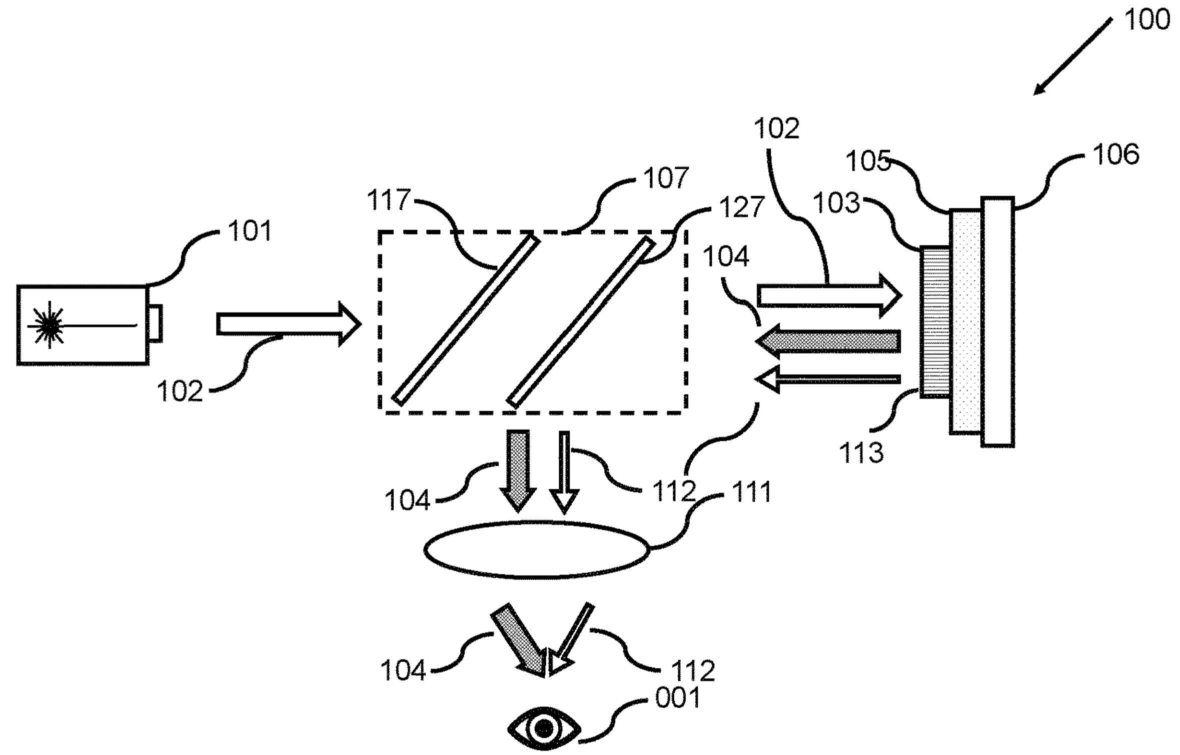
FIGS. 9(*a*) and (*b*) schematically show another alternative arrangement of the lighting device in the normal mode of operation and the safe mode of operation, respectively.
Figure 9:
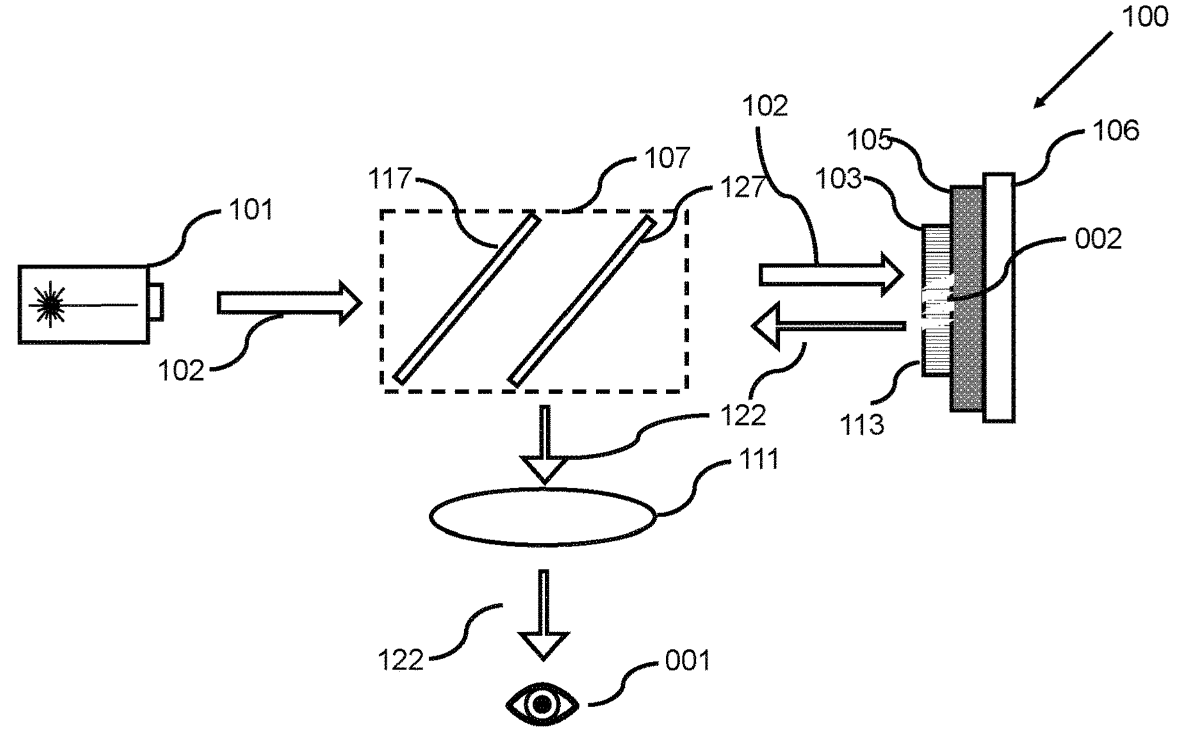

FIGS. 9(*a*) and (*b*) show an alternative arrangement of the lighting device in the normal mode of operation and the safe mode of operation, respectively. Similar to FIG. 8, the lighting device 100 comprises a first optics arrangement 107 between the first light-emitting semiconductor device 101 and the light-conversion device 103. The optical element 105 is sandwiched between the light-conversion device 103 and the light reflector 106. Therefore, the converted light output 104 and the unconverted first light output 112 is transmitted through the optical element 105 and finally reflected from the light reflector 106 towards the first optics arrangement 107. The first optics arrangement 107 is configured to reflect the converted light output 104 and the unconverted first light output 112 towards the optical lens 111 and eventually may reach the user eye 001. If the light conversion device 103 is damaged 002, the first light output 102 transmitted through the first optics arrangement 107 is directly received by the optical element 105. If the first light output 102 is above a threshold value, the optical element 105 is configured to attenuate the unsafe first light output 102 to an eye-safe level. The optical element 105 may only transmit the attenuated first light output 122. The attenuated first light output 122 is reflected from the light reflector 106 towards the first optics arrangement 107. Subsequently, the attenuated first light output 122 is reflected from the first optics arrangement 107 as well towards the optical lens 111 and eventually towards the user eye 001 as shown in FIG. 9(*b*).

Figure 10:
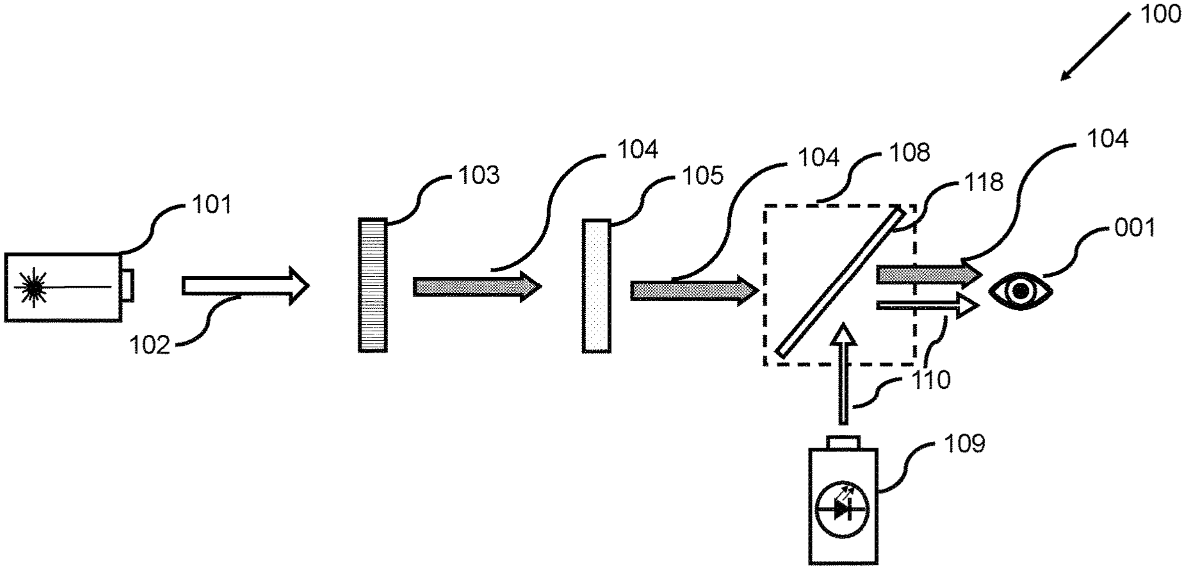
FIGS. 10(*a*) and (*b*) schematically show another alternative arrangement of the lighting device in the normal mode of operation and the safe mode of operation, respectively.
Figure 10:
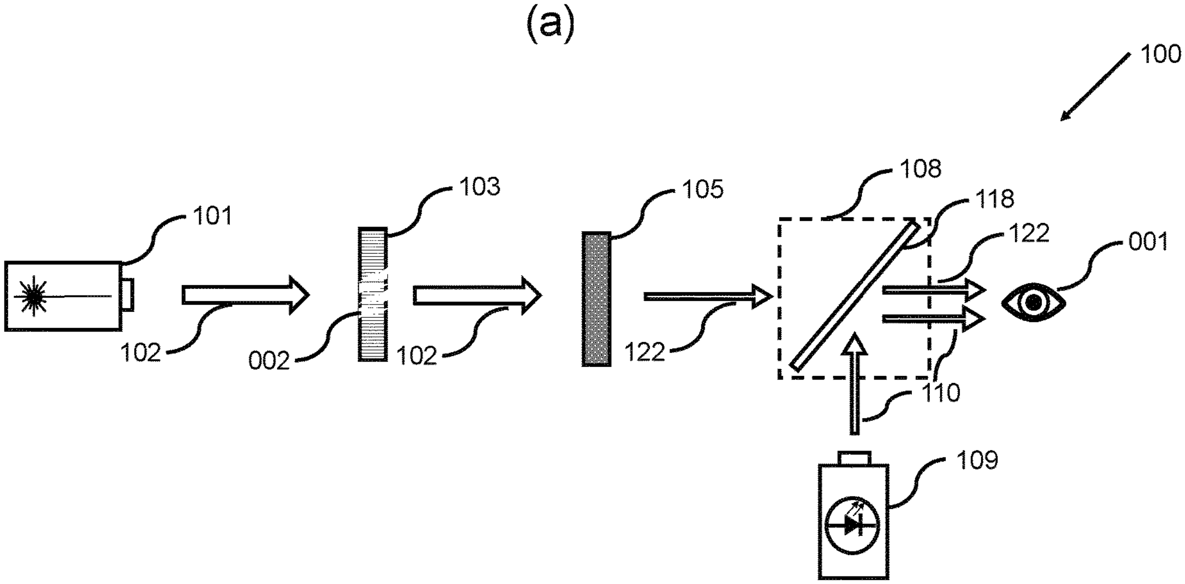

For some lighting applications, it may be preferred to introduce a secondary 20) light (for example, another blue light) with the converted light in an optical split topology as shown in FIG. 10. This arrangement of the lighting device 100 may allow more flexibility in realizing a wider range of color temperatures and color rendering indexes by suitably choosing the operation parameters of this secondary light-emitting semiconductor device 109. The lighting device 100 comprises two light sources in FIG. 10. The first light-emitting semiconductor device 101 may function as a pump laser producing the first light output 102. Hence the first light output 102 may be quite unsafe for exposure to the eye. The second light-emitting semiconductor device 109 may be a laser or an LED that is configured to emit a second light output 110 with a spectral distribution that is the same or at least comparably similar to the first spectral distribution of the first light output 102. The spectral 30) distribution of the second light-emitting semiconductor device 109 may be also in the range between 405 to 470 nm. Preferably in a range of 440 to 460 nm. But the power density can be safe for eye and general ambient exposure. As shown in FIG. 10(*a*), the light-conversion device 103 completely converts the first light output 102 into the converted light output 104. The light-conversion device 103 may partially convert the first light output 102 to an unconverted first light output as shown in FIGS. 2 to 9. The converted light output 104 is transmitted through the optical element 105 and combined with the second light output 110 by means of the second optics arrangement 108.

FIG. 10(*b*) shows the safe mode of operation for the lighting device 100. When the light-conversion device 103 is damaged 002, the first light output 102 may directly pass through the light-conversion device 103. The optical element 105 is configured to attenuate the first light output 102 at least to a safe level of attenuation if the first light output 102 is above a threshold value. The attenuated first light output 122 and the second light output 110 is also combined by means of the second optics arrangement 108. In FIG. 10, the second optics arrangement 108 can be a dichroic combiner 118 that is configured to transmit the converted light output 104 and the first light output 102, while reflecting the second light output 110 towards the user eye 001. In this case, the wavelengths and/or polarizations for the first light output 102 and the second light output 110 may be different such that the band-edge of the dichroic combiner 118 allows these two lights to be combined. However, care must be taken such that the combined light with the attenuated first light output 122 and the second light output 110 does not exceed the eye-safe level. The second optics arrangement 108 may be also implemented using a combination of different optical components, for example, a combination of polarization filter and polarization-sensitive beam splitter.

Figure 11:
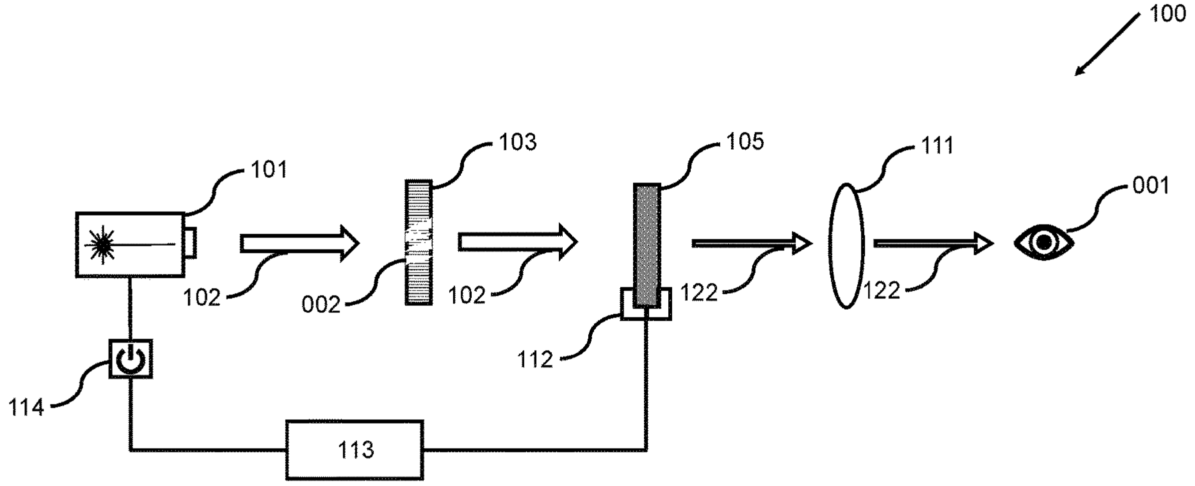
FIG. 11 schematically shows a lighting device with a thermal sensor and a controller.

FIG. 11 schematically shows a lighting device 100 with a thermal sensor 112 and a controller 113. The thermal sensor 112 is in contact with the optical element 105 and communicatively connected to the controller 113. When the first light output 102 above a threshold value is exposed to the optical element 105, the temperature of the optical element 105 may increase as well. Therefore, the controller 113 may be configured to monitor the change in temperature of the optical element 105 and determine the failure or damage 002 of the light-conversion device 113 if the detected temperature exceeds a predetermined temperature threshold value. In case a failure is detected, the controller 113 may be further configured to turn off the first light-emitting semiconductor device 101 through the power switch 114. This is an additional safety feature to further facilitate an eye-safe laser-based lighting device 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The mere fact that certain features are recited in mutually different dependent claims does not indicate that a combination of these features cannot be used to advantage. The various aspects discussed above can be combined in order to provide additional advantages. Further, the person skilled in the art will understand that two or more embodiments may be combined.

The invention claimed is:

1. A lighting device comprising, a first light-emitting semiconductor device, the first light-emitting semiconductor device being a laser device configured to generate a first light output, a light-conversion device configured to receive the first light output and to convert at least part of the first light output into a converted light output to be directed in an illumination direction, and an optical element configured to receive the converted light output from the light-conversion device, wherein the optical element comprises a bistable optical material that can change from an optical transmissive state to an optical attenuative state depending on a threshold value of the first light output, wherein the optical element is configured to transmit the converted light output and the first light output, wherein the optical element is configured to attenuate the first light output above a threshold value of the first light output, and wherein the optical element is configured for one of collimating, focusing, blurring, or diffusing light in the illumination direction.

2. A lighting device according to claim 1, wherein the light-conversion device further comprises a light reflector, and wherein the light reflector is located on the opposite side of a light entry surface of the light-conversion device.

3. A lighting device according to claim 2, wherein the lighting device further comprises a first optics arrangement that is located between the first light-emitting semiconductor device and the light-conversion device, wherein the first optics arrangement is configured to transmit the first light output towards the light-conversion device and reflect the converted light output and the first light output reflected from the light reflector of the light conversion device towards the illumination direction, and wherein the optical element is configured to receive the reflected light from the first optics arrangement.

4. A lighting device according to claim 2, wherein the lighting device further comprises a first optics arrangement that is located between the first light-emitting semiconductor device and the light-conversion device, wherein the first optics arrangement is configured to transmit the first light output towards the light-conversion device and reflect the converted light output and the first light output reflected from the light reflector of the light conversion device towards the illumination direction, and wherein the optical element is located in between the light-conversion device and the light reflector.

5. A lighting device according to claim 4, wherein the lighting device comprises an optical lens located downstream from the first optics arrangement, and wherein the optical lens is configured for one of collimating, focusing, blurring, or diffusing light in the illumination direction.

6. A lighting device according to claim 1, wherein the lighting device further comprises:

a second light-emitting semiconductor device configured to generate a second light output, and a second optics arrangement, wherein the second optics arrangement is configured to combine the second light output from the second light-emitting semiconductor device and the transmitted light from the optical element towards an illumination direction.

7. A lighting device according to claim 6, wherein the light-conversion device is configured to convert substantially all of the first light output into the converted light output.

8. A lighting device according to claim 6, wherein the lighting device comprises an optical lens located downstream from the second optics arrangement, and wherein the optical lens is configured for one of collimating, focusing, blurring, or diffusing light in the illumination direction.

9. A lighting device according to claim 1, wherein the lighting device comprises an optical lens located downstream from the optical element, and wherein the optical lens is configured for one of collimating, focusing, blurring, or diffusing light in the illumination direction.

10. A lighting device according to claim 1, wherein the optical element comprises one of a photochromic or thermochromic material that is configured to absorb or scatter the first light output above the threshold value of the first light output.

11. A lighting device according to claim 1, wherein the optical element comprises an optical phase change material that is configured to reflect, absorb, and/or scatter the first light output above the threshold value of the first light output.

12. A lighting device according to claim 1, wherein the threshold value of the first light output is a laser power density of 0.5 watts per square millimeter.

13. A lighting device according to claim 1, wherein the first light-emitting semiconductor device has a spectral power distribution in a range of 405 to 470 nm.

14. A lighting device according to claim 1, wherein the lighting device comprises a thermal sensor and a controller, wherein the thermal sensor is attached to the optical element for detecting the temperature of the optical element, wherein the thermal sensor is communicatively connected to the controller, and wherein the controller is configured to turn off the first light-emitting semiconductor device when the detected temperature exceeds a predetermined temperature threshold value.

15. A lighting device according to claim 1, wherein the change from an optical transmissive state to an optical attenuative state depending on a threshold value of the first light output occurs as a gradual change.

16. A lighting device according to claim 1, wherein the change from an optical transmissive state to an optical attenuative state is reversible.

* * * * *